United States Patent [19]

Fujiwara et al.

[11] 4,012,292

[45] Mar. 15, 1977

[54] IMAGE RECORDING MEMBER

[75] Inventors: Takutoshi Fujiwara; Yasushi Takatori, both of Tokyo; Masahiro Haruta, Funabashi; Akemi Shimosawa, Tokyo; Katsuhiko Nishide, Yokohama, all of Japan

[73] Assignee: Canon Kabushiki Kaisha, Tokyo, Japan

[22] Filed: Sept. 23, 1975

[21] Appl. No.: 615,908

[30] Foreign Application Priority Data

Sept. 25, 1974 Japan ............................ 49-110092

[52] U.S. Cl. .................................... 204/2; 346/165; 346/76 R; 346/135; 427/150

[51] Int. Cl.[2] ..................... B41M 5/20; G01D 15/34

[58] Field of Search ................... 204/2; 96/1.5, 1 E; 427/121, 126, 146, 148, 150, 145; 346/76 R, 135, 74 E

[56] References Cited

UNITED STATES PATENTS

| | | | |
|---|---|---|---|
| 3,694,202 | 9/1972 | Sawyer, Jr. | 96/1.8 |
| 3,772,159 | 11/1973 | Sakata | 204/2 |
| 3,864,684 | 2/1975 | Shimuzu | 427/145 |
| 3,875,023 | 4/1975 | Sekine | 346/135 |
| 3,936,361 | 2/1976 | Takatori et al. | 204/2 |

*Primary Examiner*—T. M. Tufariello

[57] ABSTRACT

An image recording member comprises a support and a recording layer overlying the support and mainly composed of a binder, a component capable of forming an image when electric current is applied thereto, and a conductive component composed of a mixture of an electronic conductive material and a compound containing zeolitic water, and an image can be electrically recorded by using said image recording member.

21 Claims, 3 Drawing Figures

IMAGE RECORDING MEMBER

BACKGROUND OF THE INVENTION

1. Field of the Invention

The present invention relates to an image recording member and a process for electrically recording an image by the application of electric current thereto.

2. Description of the Prior Art

Recording electrical signals as images has been increasing year by year with development of facsimile printers and recorders. Heretofore, there have been used electrical discharge recording paper and electrolyte recording paper, but they are not satisfactory because of bad odor and dust caused by recording procedure and poor image quality. In view of such unsatisfactory performance of the conventional recording papers, there have been recently proposed or put into practice some processes for electrically recording images by the application of electric current to recording papers as disclosed in Japanese Pat. Publication Nos. 22341/1963 and 101935/1973, that is, a recording paper having a layer of a metal compound such as zinc oxide and the like dispersed in a matrix having electric conductivity lower than that of the metal compound or a recording paper having a photoconductive material layer containing dispersedly a color forming agent capable of forming color by oxidation or reduction or energy change caused by electric current. The processes can produce images in an apparently dry procedure.

These electrical image recording papers do not give rise to bad odor and dust and can be easily handled due to their dry systems. These electrical image recording papers have fairly improved characteristics as compared with the prior art electrical discharge recording papers and electrolyte recording papers, but still have some disadvantage such as relatively low sharpness and low contrast probably due to spark at the time of recording, and therefore, the resulting image quality is almost similar to that obtained by the electrical discharge recording paper.

There has been proposed an improved electrical recording paper to give a better image quality (Japanese Patent Application No. 34332/1973). Since said electrical recording paper has a recording layer comprising a compound containing zeolitic water as a conductive component in place of the semiconductive material, no spark is caused between the stylus and the recording layer when recording is effected by applying electric current. Thus, neither electric discharging smell nor gas is generated and moreover, the resulting images are of high sharpness and high resolution. In general, when semiconductive materials are subjected to doping or reducing treatment to impart conductivity thereto, the semiconductive materials are apt to be colored, but compounds containing zeolitic water are highly conductive as well as white.

However, the electrical recording paper has a drawback that when the recording is effected by direct current (DC), recovering the return current from the surface of the recording layer by way of the recording layer is more difficult than in case of recording papers containing a semiconductive material as a conductive component. In other words, when the return current is recovered by bringing a return electrode material into contact with the surface of the recording layer, the recording layer is sometimes burnt and the metal thin layer directly beneath the return electrode is melted or vaporized.

SUMMARY OF THE INVENTION

According to the present invention, there is provided an image recording member which comprises a support and a recording layer overlying the support and mainly composed of a binder, a component capable of forming an image when electric current is applied thereto, and a conductive component composed of a mixture of an electronic conductive material (a material showing electronic conduction) and a compound containing zeolitic water.

According to another aspect of the present invention, there is provided a process for electrically recording an image by the application of electric current to the image recording member as mentioned above.

It is an object of the present invention to provide an image recording member in which a return current is easily recovered from the surface of the recording member by way of the recording layer in case of recording by direct current in which the excellent image recording characteristics are kept without adverse effects.

It is another object of the present invention to provide an image recording member which is apparently in a dry state and can record images at both high humidity and low humidity without the adverse effects of humidity.

It is a further object of the present invention to provide an image recording member capable of corresponding to fine changes of the electric current and capable of excellent reproduction of the original image tone.

It is still another object of the present invention to provide an image recording member having a highly white background and a good touch.

It is a still further object of the present invention to provide a process for electrically recording an image by the application of electric current through a recording electrode impressed with voltage in which the return current can be safely recovered from the surface of the recording layer without deteriorating the image quality.

DESCRIPTION OF THE PREFERRED EMBODIMENTS

Figure 1:
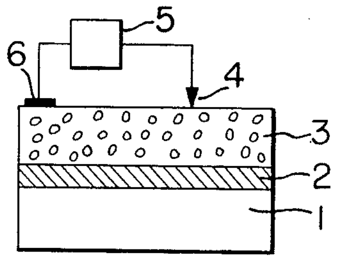
FIG. 1 and FIG. 2 diagrammatically show embodiments of the image recording member according to the present invention and further embodiments of the recording process.
Figure 2:
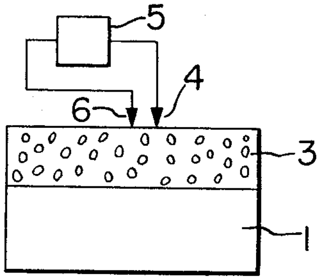

Some embodiments of the image recording member according to the present invention are illustrated in FIG. 1 and FIG. 2.

Referring to FIG. 1, an electric conductive layer 2 is mounted on a support 1, and a recording layer 3 overlies electric conductive layer 2. A stylus 4 for applying electric current to the recording member is contacted with recording layer 3 and connected to a power source 5, and a return electrode 6 is provided on recording layer 3 and is connected to power source 5.

Referring to FIG. 2, a recording layer 3 is mounted on a support 1. A stylus 4 for applying electric current to the recording member is contacted with recording layer 3 and connected to a power source 5, and a return electrode 6 is provided on recording layer 3 and is connected to power source 5.

The recording layer according to the present invention contains a binder, a component capable of forming an image when electric current is applied thereto, and a conductive component composed of a mixture of an electronic conductive material and a compound containing zeolitic water. However, if the conductive component composed of a mixture of an electronic conductive material and a compound containing zeolitic water can form an image when electric current is applied, it is not necessary to use the component capable of forming an image. For example, when the electronic conductive material is a metal compound, the conductive component often forms color when electric current is applied. Representative metal compounds include $TiO_2$, $ZnO$, $PbO$, $Sb_2O_5$ and $In_2O_3$.

Naturally, if desired, the component capable of forming an image may also be incorporated in the recording layer even when the conductive component can form a color when electric current is applied.

The image recording member according to the present invention may be prepared by mixing and dispersing a compound containing zeolitic water, an electronic conductive material and a component capable of forming an image when electric current is applied thereto, and if desired, white hiding agent, toning agent, wetting agent, defoaming agent, fog inhibitor, ultraviolet ray absorber and/or other additives in a binder and then applying to a support by, for example, coating, impregnating and the like, or by incorporating to the material for producing the support during the production process.

As the support, there may be used paper, resin film, glass, a conductive material such as metal plate, a paper having a metallic foil, a metal deposited paper, a metal powder coated paper, a carbon-treated conductive paper and a paper containing a compound containing zeolitic water and the like.

Figure 3:
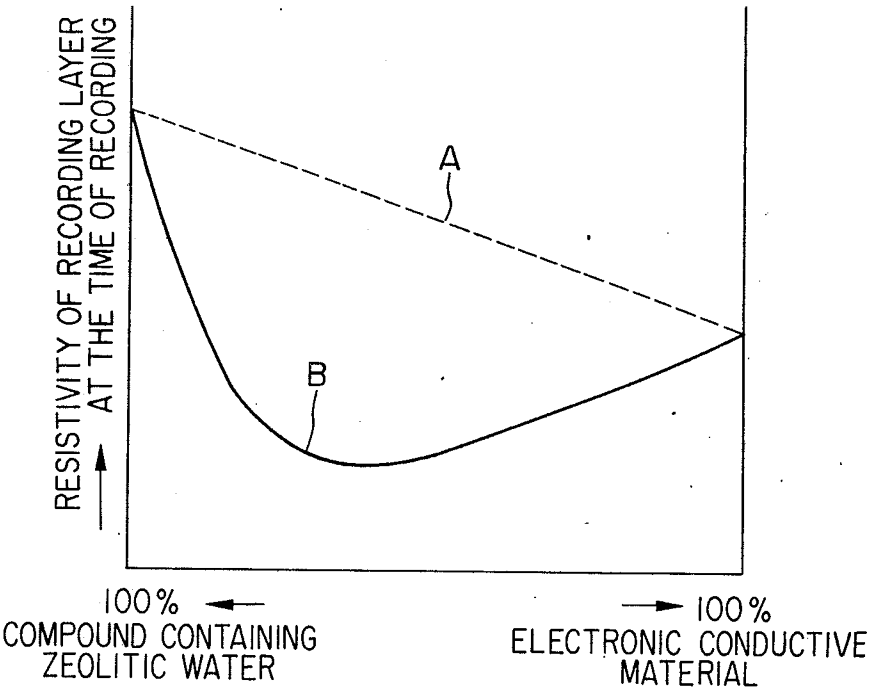
FIG. 3 is a graph showing the electric characteristics of the image recording member according to the present invention.

Referring to FIG. 3, the graph shows a relation between a mixing ratio of a compound containing zeolitic water to an electronic conductive material and the resistivity of a recording layer containing them at the time of recording by applying electric current. In general, the relation between the mixing ratio and the resistivity is thought to be indicated by the dotted line A when two materials having different electric resistances, but the actual relation curve is the solid line B. This fact shows that there is a synergistic effect between the compound containing zeolitic water and the electronic conductive material. In practice, when the amount of the electronic conductive material is not lower than 5% by weight based on the compound containing zeolitic water, the return current of the recording member can be recovered from the surface of the recording layer. However, when the amount of the electronic conductive material increases up to about 65% by weight based on the compound containing zeolitic water, the image quality of the recording member is deteriorated, that is, the sharpness of image due to the compound containing zeolitic water is lowered, and there is formed an image of low sharpness, somewhat similar to that caused by discharge breakdown, due to the electronic conductive material. Consequently, the amount of the electronic conductive material based on the compound containing zeolitic water is preferably 5–70% by weight, particularly 10–50% by weight.

The compound containing zeolitic water and the electronic conductive materials are described below in detail.

Representative compounds containing zeolitic water are natural or synthetic zeolite like compounds.

Examples of natural or synthetic zeolite are shown below.

| | |
|---|---|
| (1) Analcime Group: | |
| Analcite | $NaAlSi_2O_6 . H_2O$ |
| Pollucite | $(Cs, Na)AlSi_2O_6 . xH_2O$ ($x<1.0$) |
| Viseite | $Ca_{10}Na_2Al_{10}Si_6P_{10}(H_3)_{12}(H_2O)_{16}O_{96}$ |
| Kahoesite | $Zn_{5.5}Ca_{2.5}Al_{16}P_{16}(H_3)_{16}(H_2O)_{32}O_{96}$ |
| (2) Sodalite Group: | |
| Hydrosodalite | $Na_8(Al_6Si_6O_{12})(OH)_2$ |
| Faujasite | $Na_{28.6}Ca_{14.8}(Al_{57.6}Si_{134.4}O_{384}) . 262 . 3H_2O$ |
| Molecular sieve*A | $Na_{12}(Al_{12}Si_{12}O_{24})Na\ AlO_2 . 29H_2O$ |
| " *X | $Na_2(Al_2Si_{2.8}O_{9.6}) . xH_2O$ ($x \approx 6$) |
| " *Y | $Na_2O . Al_2O_3 . 3\sim6SiO_2 . xH_2O$ |
| " *SK | substantially identical to faujasite |
| *: Synthetic zeolite manufactured by Union Carbide Co. | |
| (3) Chabazite Group: | |
| Chabazite | $(Ca, Na_2)(Al_2Si_4O_{12}) . 6H_2O$ |
| Gmelinite | $(Na_2, Ca)(Al_2Si_4O_{12}) . 6H_2O$ |
| Erionite | $(Ca, Mg, Na_2, K_2) . Al_2Si_4O_{12} . 6H_2O$ |
| Levynite | $Ca(Al_2Si_4O_{12}) . 6H_2O$ |
| Molecular sieve *R | the same as Chabazite |
| " *S | the same as Gmelinite |
| " *T | the same as Elionite |
| (4) Natrolite Group: | |
| Natrolite | $Na_2(Al_2Si_3O_{10}) . 2H_2O$ |
| Mesolite | $Na_2Ca_2(Al_6Si_9O_{30}) . 8H_2O$ |
| Scolecite | $Ca(Al_2Si_3O_{10}) . 3H_2O$ |
| Thomsonite | $NaCa_2(Al_5Si_5O_{20}) . 6H_2O$ |
| Edingtonite | $Ba(Al_2Si_3O_{10}) . 4H_2O$ |
| Gonnardite | $Na_2Ca(Al_4Si_6O_{20}) . 6H_2O$ |
| Rhodesite | $KNaCa_2(H_2Si_8O_{20}) . 5H_2O$ |
| Mountainite | $KNa_2Ca_2(HSi_8O_{20}) . 5H_2O$ |
| (5) Harmotome Group: | |
| Harmotome | $Ba_2(Al_4Si_{12}O_{32}) . 4H_2O$ |
| Phillipsite | $(K_xNa_{1-x})_5(Al_5Si_{11}O_{32}) . 10H_2O$ |
| Gismondite | $Ca(Al_2Si_2O_8) . 4H_2O$ |
| Molecular sieve *B | $Na_2(Al_2Si_3O_{10}) . 5H_2O$ |
| Garronite | $NaCa_{2.5}(Al_3Si_5O_{16})_2 . 13 . 5H_2O$ |
| (6) Mordenite Group: | |
| Mordenite | $Na(AlSi_5O_{12}) . 3H_2O$ |
| D'Achiardite | $(Na_2Ca)_2(Al_4Si_{20}O_{48}) . 12H_2O$ |
| Ferrierite | $Na_{1.5}Mg_2(Al_{5.5}Si_{30.5}O_{72}) . 18H_2O$ |
| Zeolon** | the same as Mordenite |

(**: manufactured by Norton Co)

Examples of zeolite of non-determined structure are shown below.

| | |
|---|---|
| Heulandite | $Ca(Al_2Si_7O_{18}) . 6H_2O$ |
| Clinoptilotite | $Na_{0.95}K_{0.30}Ca_{0.5}(Al_{1.35}Si_{7.65}O_{18}) . 5H_2O$ |
| Stilbite | $Ca(Al_2Si_7O_{18}) . 7H_2O$ |
| Epistilbite | $Ca(Al_2Si_6O_{16}) . 5H_2O$ |
| Brewsterite | $(Sr,Ba,Ca)(Al_2Si_6O_{16}) . 5H_2O$ |
| Laumontite | $Ca(AlSi_2O_6) . 4H_2O$ |
| Yugawaralite | $Ca(Al_2Si_5O_{14}) . 3H_2O$ |
| Paulingite | $(K,Ca,Na)_{120}[(Al,Si)_{580}O_{1160}] . 690H_2O$ |
| Aschcroftine | $[KNa(Ca,Mg,Mn)]_{120}(Al_{160}Si_{200}O_{720}) . 320H_2O$ |
| Bikitaite | $LiAlSi_2O_6 . H_2O$ |

All the above compounds are applicable to the invention. Zeolite-like compounds used in the present invention are exemplified in the following.

1) Zeolite-like silicate

They are not classified in Zeolite, but contain zeolitic water.

| | |
|---|---|
| Beryl | $Al_2Be_3[Si_6O_{18}] . nH_2O$ |
| Cordierite | $Mg_2Al_3[AlSi_5O_{18}] . nH_2O$ |
| Milarite | $KCa_2AlBe_2[Si_{12}O_{30}] . 0.5H_2O$ |
| Osumilite | $(K,Na,Ca)(Mg,Fe)_2(Al,Fe)_3[(Si,Al)_{12}O_{30}] . H_2O$ |

-continued

| | |
|---|---|
| Hydrated Nepheline | $KNa_3(Al_4Si_4O_{16}) \cdot nH_2O$ |
| Cancrinite | $Na_6Ca_6(Al_6Si_6O_{24})CO_3 \cdot 3H_2O$ |
| Buddingtonite | $NH_4AlSi_3O_8 \cdot 0.5H_2O$ |
| 2) Other Zeolite-like compounds | |
| I) Germanate | $M_3[HGe_4(GeO_4)_3O_4] \cdot 4H_2O$ M is a metal ion. |
| II) Phosphate and Arsenate | |
| Scorodite | $FeAsO_4 \cdot 2H_2O$ |
| Pharmacosiderite | $K[Fe_4(OH)_4(AsO_4)_3] \cdot 6\sim7H_2O$ |
| III) Water containing metal oxide | |
| Psilomelane | $(Ba,H_2O)_2 \cdot Mn_5O_{10}$ |
| IV) Three dimensional structure complex | |
| Prussian blue | $M_3[Fe(CN)_6]_2 \cdot 12H_2O$, (M = Mn,Fe,Co,Ni,Zn,Cd) |
| Weddellite | $CaC_2O_4 \cdot (2+x)H_2O$ ($x \leqq 0.5$) |

The above listed compounds are All applicable to the present invention and those which have large "cavity" volume and a high water content, thereby exhibiting good conductivity, are preferred.

Representative electronic conductive material used in the present invention may be finely divided metal powders such as Al, Fe, Ni, Cu, Zn, Sn, Ag, Au, Bi, Mo, Pb and the like, metal oxides such as $TiO_2$, PbO, ZnO, MgO, $Ni_2O_3$, CdO, $Fe_2O_3$, $Ag_2O$, HgO, $Bi_2O_3$, CeO, $V_2O_5$, $Sb_2O_5$, $SnO_2$, $BaTiO_3$, $In_2O_3$, $Nb_2O_5$, $MnO_2$, $La_2O_3$ and the like, metal sulfates such as $BaSO_4$ and the like, metal halides such as CuI, CuBr and the like, metal sulfides such as CaS, GeS and the like, metal carbonates such as $PbCO_3$ and the like, metal carbide such as SiC and the like, intermetallic compounds such as CdSe, ZnSe, SnSe and the like, those compounds doped with a various metal, and pigments to which a conductive film such as $SnO_2$ film, metal deposited film, metal plating film and the like is attached.

Representative binders used in this invention are: natural high polymer materials such as gelatine, casein, gum, arabic, shellac, starch, its decomposition products, derivatives, alginic acid and its derivatives and the like; cellulose derivatives such as cellulose nitrate, carboxymethyl cellulose and the like; half-synthetic high polymers, for example, natural rubber plastics such as rubber chloride, cyclized rubber and the like; synthetic high polymers of polymerization type such as polyisobutylene, polystyrene, terpene resin, polyacrylic acid and its salts, polyacrylic acid ester, polymethacrylic acid and its salts, polymethacrylic acid ester, polyacrylonitrile, polyacrylamide, polyvinyl chloride, polyvinyl alcohol, polyvinyl pyrrolidone, polyacetal resin, polyvinyl chloride, polyvinyl pyridine, polyvinyl carbazole, polybutadiene, polystyrenebutadiene, butyl rubber, polyoxymethylene, polyethylene imine, polyethylene imine hydrochloride, poly(2-acryloxyethyldimethylsulfonium chloride), monoalkyl ester of poly(vinyl methyl ether/maleic anhydride), and the like; resins such as phenolic resin, amino resin, toluene resin, alkyd resin, unsaturated polyester resin, allyl resin, polycarbonate, polyamide resin, polyether resin, silicone resin, furan resin, Jhiokol rubber, polyurethane, polyurea, epoxy resin, and the like; emulsion such as styrene-butadiene series, vinyl chloride series, vinyl acetate series, and the like; and styrene-maleic anhydride copolymer, vinyl methyl ether-maleic anhydride copolymer and the like. Further, a high polymer electrolyte may be also used as the binder.

The image forming agent, that is, the component capable of forming an image when electric current is applied thereto, as used in the present invention is that capable of forming an image in response to change of energy by the application of electric current, and various known compounds may be used as the image forming agent.

For example, color formers of oxidation type, color formers of reduction type, pH indicators, and heat sensitive color formers may be used.

Representative color formers of oxidation type are:

leuco compounds of diphenylmethane dye, for example, Michler's methane base such as bis-(p-dimethylaminophenyl) methane, 9,9'-diethyl-6,6'-dichloro-3,3'-dicarbazolylmethane, (9-ethyl-6-methyl-3-carbazolyl)-p-dimethylaminophenylmethane and the like, and leuco-auramines such as leuco-auramine, N,N diethyl leuco-auramine, phenylsulfonamido-bis-(p-dimethylaminophenyl)methane, bis-(p-dimethylaminophenyl) benzotriazinylmethane, bis-(p-diethylaminophenyl)morpholinylmethane and the like; leuco compounds of triphenylmethane dye, for example, diaminotriphenyl methanes such as leuco-malachite Green, 3,3'-dicarbazolylphenyl methane and the like, triaminophenyl methanes such as leuco Crystal Violet, 9,9', 9''-triethyl-3,3',3''-tricarbazolylmethane and the like, and hydroxy-triphenylmethanes such as bis-(3-methyl-4-hydroxy-5-carboxyphenyl)-2,6-dichlorophenylmethane, bis-(3-methyl-4-hydroxy-5-carboxyphenyl)-4-diethylaminophenylmethane and the like;

leuco compounds of xanthene dye such as 3,6-di(-dimethylamino)xanthene and the like;

leuco compounds of acridine dye such as 3,6-diamino-2,7-dimethyl-9-phenyl-acridane, 3,6-di(dimethylamino)acridane and the like;

leuco compounds of azine dye such as 2-methyl-3-amino-7-dimethylamino-5,10-dihydrophenazine, 3,7-diamino-5-phenyl-5,10-dihydrophenazine and the like;

leuco compounds of oxazine dye such as 3,7-di(-dimethylamino)phenoxazine and the like; and leuco compounds of thiazine such as 3,7-di(dimethylamino)phenothiazine and the like.

Further examples of the color former of oxidation type are reduced forms of indigo and indigoid dyes, leucophthalocyanine dye, and para-quinone vat dye such as benzoquinone dye, naphthoquinone dye, anthraquinone dye and the like.

Still further examples of the color former of oxidation type are aromatic amino compounds such as p-aminodiphenylamine, diphenylbenzidine, oxidation bases which produce oxidation dyes, for example, phenols such as 4-methoxy-1-Naphtol, 1,5-dihydroxynaphthalene and the like, and sulfide dyes such as 2-mercapt-3-hydroxy-7-dimethylaminophenothiazine and the like.

Representative color formers of reduction type are: tetrazolium salts such as triphenyltetrazolium chloride, ditetrazolium chloride and the like, long chain aliphatic acid iron salts such as ferric stearate and the like, organic acid noble metal salts such as silver behenate, silver stearate, and the like, oxalic acid metal salts such as silver oxalate, nickel oxalate and the like, metal carbonates such as manganese carbonate, cobalt carbonate and the like, metal chlorides such as nickel chloride, copper chloride, and the like heterocyclic quaternary ammonium salts capable of forming anhydronium bases by reduction such as 1-methyl-2-2',4'-dinitrobenzylpyridinium p-toluene sulfonate, 1-methyl-4-chloroquinaldinium sulphate and the like, and other metal compounds such as molybdenum trioxide, thorium oxide, cerium oxide, phosphotungstic acid, phosphomolybdic acid, ammonium phosphomolybdate, tungstic acid, molybdic acid and the like.

Representative heat sensitive color formers include one-component heat sensitive color forming agents such as indole derivatives, pyrrolone derivatives, and substituted aminodithioformic acid heavy metal salts; and two-component heat sensitive color forming agents, for example, long chain aliphatic acid iron salt-phenol such as ferric stearate-tannic acid or ammonium salicylate, organic acid heavy metal salt-alkaline earth metal sulfide or organic chelating agent such as nickel acetate-diphenylcarbazone, organic acid noble metal salt-aromatic organic-reducing agent such as silver behenatehydroquinone or protocatechuic acid, and higher aliphatic acid heavy metal salt-zinc disubstituted dithiocarbamate derivative such as ferric stearate-zinc dibutyl dithiocarbamate and the like.

Further examples of the two-component heat sensitive color forming agents are a combination of an acidic compound such as bisphenol-A, α-naphthol, palmitic acid and the like with a color forming lactone compound such as Crystal Violet lactone, 3-dimethylamino-6-methoxyfluoran, and the like, a color forming lactam compound such as Rhodamine B lactam and the like, a leuco compound of dye such as leuco Crystal Violet, leuco auramine, leuco Malachite Green and the like, or a spiropyran compound such as 1,3,3-trimethylindolino-8'-methoxy spirobenzopyran, 1-amyl-3,3-dimethylindolino-8'-ethoxyspirobenzopyran and the like.

Still further examples of color forming means are a color formation by incorporating an iodine compound such as potassium iodide to a recording layer, isolating electrically iodine and causing starch-iodine reaction and a color formation by incorporating an iodine compound and an amine or its derivative to a recording layer, isolating electrically iodine and causing a reaction of the iodine with the amine or its derivative.

The image recording member and recording process according to the present invention may be used for various recording purposes. For example, they may be used for recording receiving signals of facsimile, outputs from a computer and its terminal equipment and data form various kinds of measuring apparatuses for industry, medicine, business and the like.

The following examples further illustrate the present invention.

Example 1

| | |
|---|---|
| Molecular Sieve of 13X type (trade name, synthetic zeolite, manufactured by Union Carbide Corp) | 6 g |
| Crystal Violet Lactone | 3 g |
| Polyvinyl alcohol (degree of polymerization, 1000; degree of saponification, 85%) | 3 g |
| Zinc oxide | 1 g |
| Water | 12 g |

The above composition was mixed in a ball-mill for two days and nights. The resulting dispersion was designated as Component A.

| | |
|---|---|
| Molecular Sieve of 13X type (trade name, synthetic zeolite, manufactured by Union Carbide Corp.) | 6 g |
| Bishphenol A | 5 g |
| Polyvinyl alcohol (degree of polymerization, 1000; degree of saponification, 85%) | 3 g |
| Zinc oxide | 1 g |
| Water | 12 g |

The above composition was mixed in a ball-mill for two days and nights and the resulting dispersion was designated as Component B.

Components A and B were mixed and then immediately coated on an aluminum vapor deposited paper by using a coating bar and dried to produce a coating layer of about 10 microns thick.

An electrically conductive rubber containing carbon (800 ohm.cm) was pressed to a surface of a recording layer so as to have a contact area of about 5cm$^2$ and was connected with the positive electrode of the recording electric circuit while a stylus was connected to the negative electrode. Voltage of 200V was applied and the recording was effected at a scanning speed of 0.7m/sec. and there was obtained a blue image of high sharpness without damaging the return electrode portion at all.

The resulting color tone was the same as that of a recording paper prepared without using zinc oxide. This fact indicates that color formation caused by the reduction of zinc oxide is not added thereto.

Example 2

| | |
|---|---|
| Molecular Sieve of 3A type (trade name, manufactured by Union Carbide Corp., synthetic zeolite) | 150 g |
| $BaTiO_3$ (subjected to reduction treatment) | 20 g |
| Sodium alginate (NSPLL, trade name, manufactured by Kamogawa Kasei Kogyo K.K.) | 20 g |
| Water | 540 g |

The above composition was dispersed by using a ball-mill for one day and night, coated on an aluminum vapor-deposited paper with a coating bar to produce a layer of 10 microns thick.

A part of the recording layer surface was pressed with a paper-holding means of aluminum having a smooth and flat surface and a stylus was kept at a negative polarity to effect recording at 200V, 20mA. and 0.7m/sec. and there was obtained a highly sharp and brawn image without damaging the return electrode portion.

Example 3

| | |
|---|---|
| Ditetrazolium chloride | 2 g |
| Polyvinyl butyral (degree of polymerization, 1500) | 10 g |
| Tin dioxide (99.9% in purity) | 5 g |
| Ethanol | 150 g |

To the above composition was added 30g of a compound containing zeolitic water as listed in the following table and mixed in a ball-mill for two days and nights. The resulting mixture was coated on an aluminum laminate paper with a coating bar and dried to produce a layer of 8 microns thick. On the other hand, the same mixture as above excluding tin dioxide was also prepared, and then coated and dried in a way similar to above.

A part of the surface of the recording layer was pressed with an elastomer containing dispersedly silver powder and the elastomer is connected with a positive electrode while a tungsten stylus was connected to a negative electrode, and then direct current voltage of about 150V was applied and scanning by the stylus was effected at a speed of 70cm/min. The results are shown in the following Table.

| Compound containing Zeolite water | Burn at the return electrode | |
|---|---|---|
| | In the absence of $SnO_2$ | In the presence of $SnO_2$ |
| Molecular Sieve SK-40 | Δ | O |
| Molecular Sieve 5A | Δ | O |
| Weddellite | Δ | O |
| Chabazite | X | O |
| Clinoptilotite | X | O |
| Mordenite | X | O |
| Analcite | Δ | O |

O: No burn is formed.
Δ: Sometimes burn is formed.
X: A large burn is always formed.

Repeating the above procedure except that ZnO, $Sb_2O_5$, $TiO_2$, $In_2O_3$, CuI, ZnS, SiC, aluminum powder or silver powder was used in place of $SnO_2$, there was obtained a sharp image without burn as compared with the corresponding sample excluding it.

We claim:

1. An image recording member which comprises a support and a recording layer overlying the support, said recording layer being mainly composed of a binder, a component capable of forming an image when electric current is applied thereto, and a conductive component composed of a mixture of a compound containing zeolitic water and an electrically conductive material selected from the group consisting of finely divided metal powders, metal oxides selected from PbO, ZnO, MgO, $Ni_2O_3$, CdO, $Fe_2O_3$, $Ag_2O$, HgO, $Bi_2O_3$, CeO, $V_2O_5$, $Sb_2O_5$, $SnO_2$, $BaTiO_3$, $In_2O_3$, $Nb_2O_5$, $MnO_2$ and $La_2O_3$, metal sulfates, metal halides, metal carbonates, metal carbide and intermetallic compounds doped with a metal, wherein the amount of the electrically conductive material is between 5–70% by weight based on the compound containing zeolitic water.

2. An image recording member according to claim 1 in which the compound containing zeolitic water is a zeolite.

3. An image recording member according to claim 1, in which the compound containing zeolitic water is a zeolite selected from the class of analcime group, sodalite group, chabazite group, natrolite group, harmotome group and mordenite group.

4. An image recording member according to claim 1 in which the compound containing zeolitic water is an artificial zeolite.

5. An image recording member according to claim 1 in which the electronic conductive material is metal powder.

6. An image recording member according to claim 1 in which the electronic conductive material is a metal compound.

7. An image recording member according to claim 1 in which the electronic conductive material is a metal oxide.

8. An image recording member according to claim 1 in which the electronic conductive material is a metal sulfate.

9. An image recording member according to claim 1 in which the electronic conductive material is a metal halide.

10. An image recording member according to claim 1 in which the electronic conductive material is a metal sulfide.

11. An image recording member according to claim 1 in which the electronic conductive material is a metal carbonate.

12. An image recording member according to claim 1 in which the electronic conductive material is an intermetallic compound.

13. An image recording member according to claim 1 in which the electronic conductive material is a pigment to which a conductive film is attached.

14. An image recording member according to claim 1 in which the amount of the electronic conductive material is 10–50% by weight based on the compound containing zeolitic water.

15. An image recording member according to claim 1 in which the support is conductive.

16. An image recording member according to claim 1 in which the component capable of forming images when electric current is applied is a combination of a dye leuco body and a phenolic compound.

17. An image recording member which comprises a conductive support and a recording layer overlying the conductive support, said recording layer being mainly composed of a binder, a component capable of forming images when electric current is applied thereto, and a conductive component composed of a mixture of a zeolite and a metal oxide selected from PbO, ZnO, MgO, Ni2$O_3$, CdO, $Fe_2O_3$, $Ag_2O$, HgO, $Bi_2O_3$, CeO, $V_2O_5$, $Sb_2O_5$, $SnO_2$, $BaTiO_3$, $In_2O_3$, $Nb_2O_5$, $MnO_2$ and $La_2O_3$, wherein the ratio of the zeolite to the metal oxide is in the range of between 6:1 and 7.5:1.

18. A process for electrically recording an image by the application of electric current, which comprises the step of applying electric current to an image recording member which comprises a support and a recording layer overlying the support, said recording layer being mainly composed of a binder, a component capable of forming an image when electric current is applied thereto, and a conductive component composed of a mixture of a compound containing zeolitic water and an electrically conductive material selected from the group consisting of finely divided metal powders, metal oxides selected from PbO, ZnO, MgO, $Ni_2O_3$, CdO, $Fe_2O_3$, $Ag_2O$, HgO, $Bi_2O_3$, CeO, $V_2O_5$, $Sb_2O_5$, $SnO_2$, $BaTiO_3$, $In_2O_3$, $Nb_2O_5$, $MnO_2$ and $La_2O_3$, metal sulfates, metal halides, metal carbonates, metal carbide and intermetallic compounds doped with a metal, wherein the amount of the electrically conductive material is between 5–70% by weight based on the compound containing zeolitic water.

19. A process according to claim 18 in which a recording electrode and a return electrode are provided on the recording layer and electric current is applied therebetween.

20. A process according to claim 18 in which the conductive component is a mixture of a zeolite and a metal oxide.

21. A process according to claim 20 in which a recording electrode and a return electrode are provided on the recording layer and electric current is applied therebetween.

* * * * *